United States Patent [19]

Carr et al.

[11] Patent Number: 5,366,791
[45] Date of Patent: Nov. 22, 1994

[54] THERMOFORMABLE LAMINATE MATERIAL WITH REGISTERED PRINT AND METHOD OF MAKING THE SAME

[75] Inventors: John Carr, Phoenixville; Joseph Kucherovsky, Philadelphia; Harry R. Peppiatt, Doylestown, all of Pa.

[73] Assignee: Paramount Packaging Corporation, Chalfont, Pa.

[21] Appl. No.: 778,360

[22] Filed: Oct. 17, 1991

Related U.S. Application Data

[63] Continuation-in-part of Ser. No. 548,781, Jul. 6, 1990.

[51] Int. Cl.⁵ .............................................. B32B 9/00
[52] U.S. Cl. ................................... 428/195; 428/35.7; 428/212; 428/913; 156/60; 206/524.2
[58] Field of Search .............. 428/195, 212, 913, 35.7, 428/317.7; 156/60; 426/107, 113, 127; 206/524.2

[56] References Cited

U.S. PATENT DOCUMENTS

| | | | |
|---|---|---|---|
| 2,974,057 | 3/1961 | Adams | 117/12 |
| 3,356,560 | 12/1967 | Callum | 161/5 |
| 3,562,095 | 2/1971 | Rahl et al. | 161/233 |
| 3,619,344 | 11/1971 | Wolinski et al. | 428/319.7 |
| 3,717,544 | 2/1973 | Valyl | 161/252 |
| 3,719,735 | 3/1973 | Valyl | 264/89 |
| 3,755,063 | 8/1973 | Massey et al. | 428/316.6 |
| 3,787,157 | 1/1974 | Valyl | 425/112 |
| 3,818,085 | 6/1974 | Marvland, Jr. et al. | 264/45.2 |
| 3,939,239 | 2/1976 | Valyl | 264/89 |
| 4,008,347 | 2/1977 | Amberg et al. | 428/35 |
| 4,036,675 | 7/1977 | Amberg et al. | 428/317.7 |
| 4,183,435 | 1/1980 | Thompson et al. | 206/557 |
| 4,289,817 | 9/1981 | Valyl | 428/35 |
| 4,442,158 | 4/1984 | Distler | 428/195 |
| 4,443,507 | 4/1984 | Yamada et al. | 428/114 |
| 4,578,297 | 3/1986 | Duncan | 428/316.6 |
| 4,729,917 | 3/1988 | Symdra et al. | 428/316.6 |
| 4,819,406 | 4/1989 | Redmond | 53/51 |
| 4,828,910 | 5/1989 | Haussling | 428/285 |
| 4,832,775 | 5/1989 | Park et al. | 156/272.6 |
| 4,873,137 | 10/1989 | Deyrup | 428/216 |
| 4,890,439 | 1/1990 | Smart et al. | 428/458 |
| 4,965,123 | 10/1990 | Swan et al. | 428/316.6 |

FOREIGN PATENT DOCUMENTS 0322264 6/1989 European Pat. Off. .

OTHER PUBLICATIONS

FLEXO Magazine, May 1991.
Wacky Blasters Game Board.

*Primary Examiner*—Patrick J. Ryan
*Assistant Examiner*—William A. Krynski
*Attorney, Agent, or Firm*—Fitzpatrick, Cella, Harper & Scinto

[57] ABSTRACT

A plurality of like, thermoformable plastic laminate articles and a method of making same in which a substantially flexible plastic sheet is bonded to a substantially rigid thermoformable plastic core. The sheet has markings disposed on one face thereof, and the markings are disposed at the same predetermined location with respect to the core for all of the plurality of articles.

41 Claims, 4 Drawing Sheets

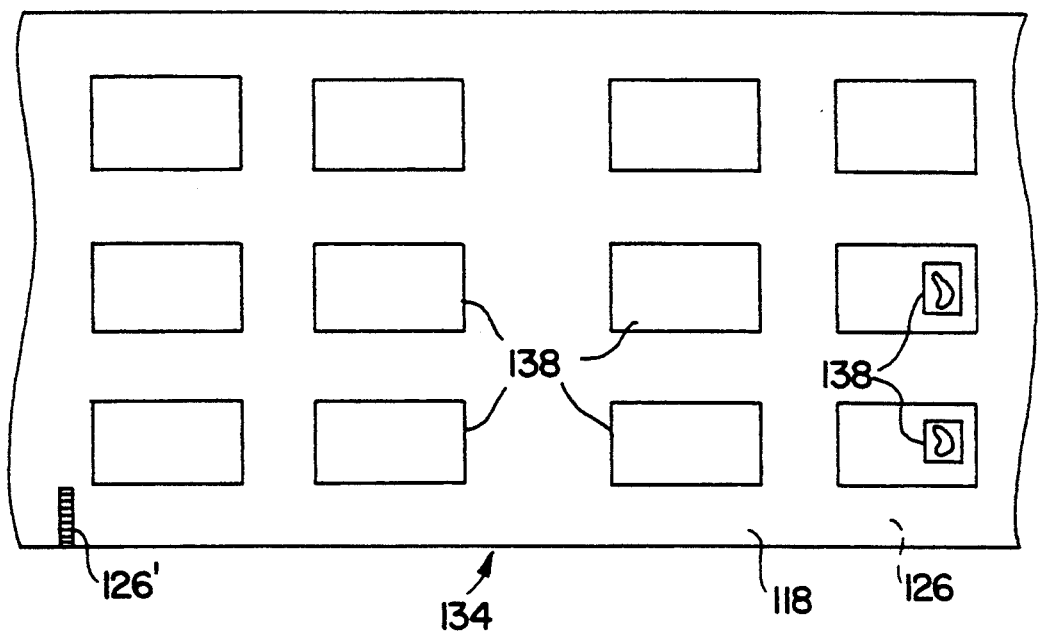
F I G. 5
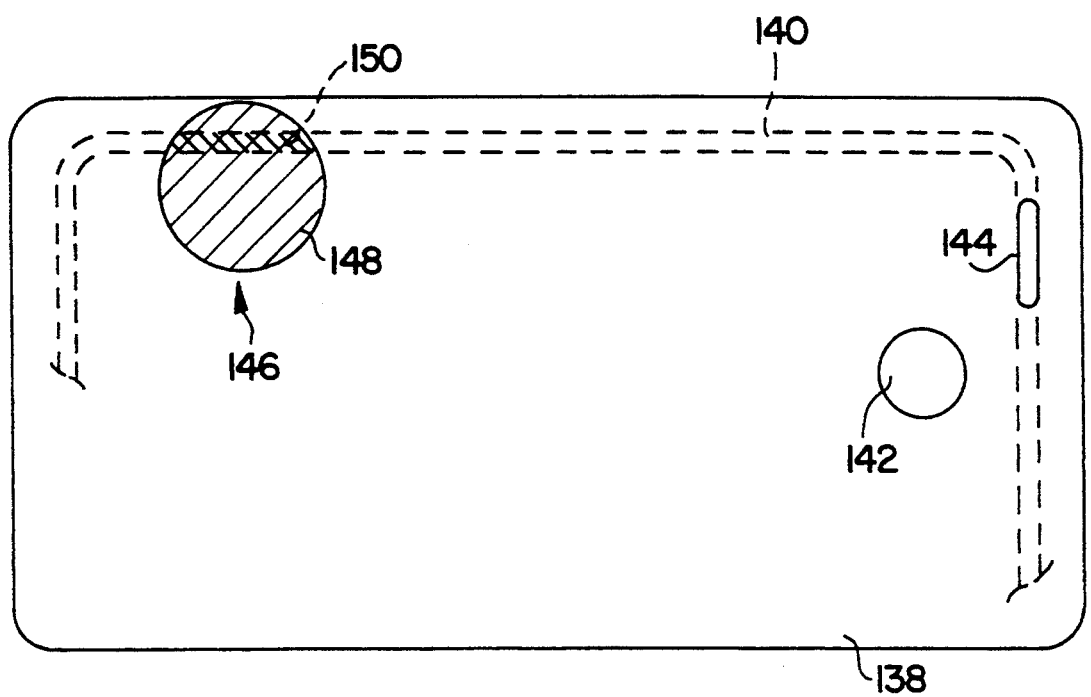
F I G. 6

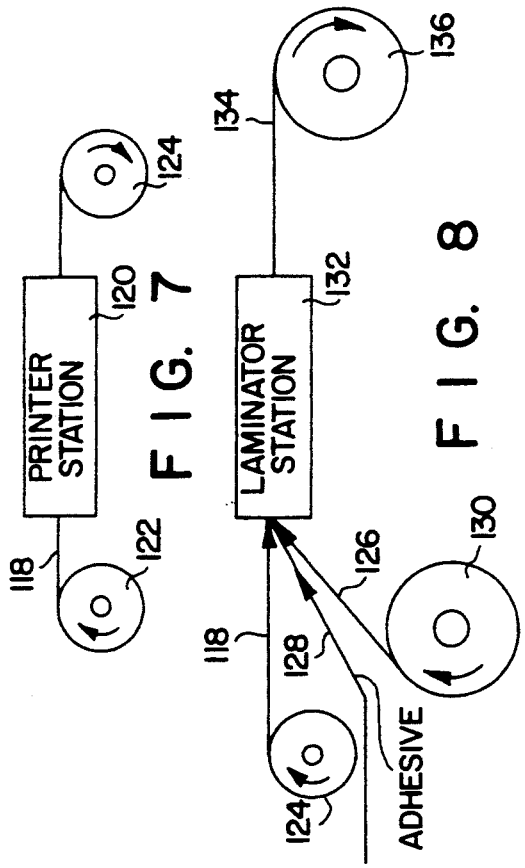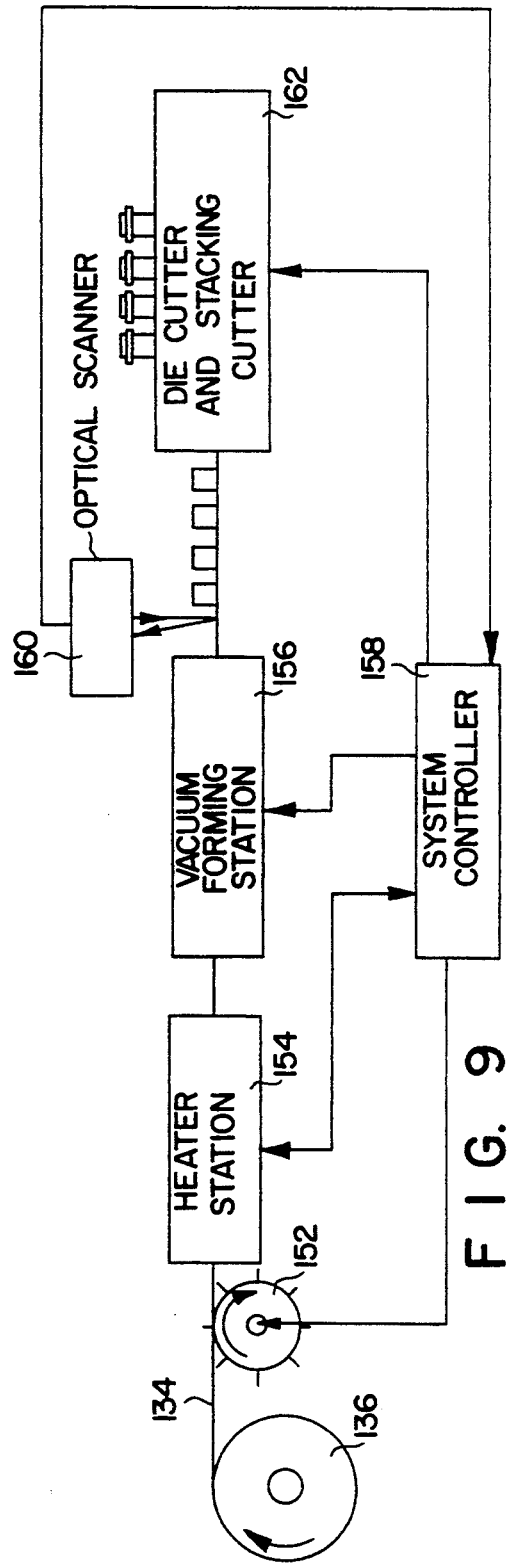

THERMOFORMABLE LAMINATE MATERIAL WITH REGISTERED PRINT AND METHOD OF MAKING THE SAME

This is a continuation-in-part of U.S. patent application Ser. No. 07/548,781 filed Jul. 6, 1990.

BACKGROUND OF THE INVENTION

1. Field of the Invention

This invention relates to a polymeric laminate material containing printed matter which may be thermoformed into various shapes.

2. Background of the Invention

In general, laminated materials for ultimate use as containers, trays, etc. are known in the art.

For example, U.S. Pat. No. 2,974,057 discloses plasticized films comprising a rigid polymeric self-supporting sheet of plasticized polyvinyl chloride polymer and a coating of a cellulosic polymer and an acrylate. The rigid self-supporting sheet material may optionally contain printed matter.

U.S. Pat. No. 3,356,560 discloses a heat-formable sheet material comprising a core layer, a protective skin layer on one side of the core and an outer coating layer on the opposing side of the core. The core layer of this patent comprises a gum-plastic, such as a rubber or a resin based on acrylonitrile, butadiene, and styrene. The protective skin layer is a mixture of a butadiene-acrylonitrile rubber and a polyvinyl chloride resin and the outer coating layer is disclosed as being a blend of a polyvinyl halide polymer, styrene and methyl methacrylate.

U.S. Pat. No. 3,562,095 discloses a synthetic resin laminate comprising a center core layer of an unsaturated polyester with one or more multifunctional monomers and a second layer comprising a synthetic resinous thermoplastic polymer bonded to at least one face of the core. The resinous thermoplastic polymer used in the laminate of this patent may comprise polyvinyl chloride, chlorinated polyvinyl chloride, chlorinated polyethylene and related materials.

U.S. Pat. No. 4,289,817 discloses lined, hollow plastic articles and a method of making the same. The articles of this patent comprise an outer pressure molded first portion of a transparent plastic material and a drawn inner second portion of a plastic material. The inner material may be any one of acetal polymers, polyolefins, etc., while the outer thermoplastic layer must be transparent or translucent and may comprise polyolefins, polystyrene, etc. This patent is related to U.S. Pat. Nos. 3,717,544; 3,719,735; 3,787,157 and 3,939,239.

U.S. Pat. No. 4,442,158 discloses a plastic laminate adapted for use as a food package comprising an exterior polypropylene layer, a middle polyvinylidene chloride layer and an inner ionomer resin layer. U.S. Pat. Nos. 4,443,507 and 4,873,137 disclose examples of laminated polymeric materials which comprise layers reinforced with fibers and glass flakes, respectively.

Although laminated polymeric materials are known in the art, the known materials have demonstrated drawbacks, such as difficulties with or a complete inability to print the material, delamination of the layers, etc. Therefore, there is a need for a thermoformable laminate material which is satisfactory in all respects.

Another problem of known polymeric laminate articles was the inability to precisely print information and designs on the articles. For example, the plastic articles discussed in the patents noted above had markings randomly located with respect to the article shape. This is disadvantageous, for example, in the food packaging art wherein markings such as a bar code, a trademark, a list of ingredients, depictions of food products, etc., are desired to be precisely located on each package to produce an attractive and easily marketable package. The ability to specifically register the markings with respect to predetermined locations on the thermoformable articles is a very desirable feature in a thermoformable plastic laminate article.

SUMMARY OF THE INVENTION

The present invention is directed to a thermoformable laminate material comprising a rigid polymeric core material having interior and exterior faces, and a first flexible sheet material having two opposing faces one of which is laminated to one face of the rigid polymeric core material, wherein one face of the flexible sheet is printed prior to lamination. Preferably, the first flexible sheet material is laminated to the exterior face of the core. The invention may further include a thermoformable material comprising a second flexible sheet material having two opposing sides which is laminated to the interior face of the rigid polymeric core material. The second flexible sheet material may also be printed on one side prior to lamination. The present laminate may also comprise a lid component attached to the rigid core material. A method for the production of the thermoformable polymeric materials of this invention is also disclosed.

The present invention is also directed to a plurality of like thermoformable plastic laminate structures, each structure comprising a substantially rigid thermoformable plastic core, and one or more substantially flexible transparent plastic sheets bonded to the core. The sheet preferably has an ink disposed on the face thereof which contacts the core. The ink is disposed at the same predetermined location with respect to the core for all of the plurality of structures. Thus, the ink is "registered" with respect to predetermined locations on the cores.

The present invention is also directed to a method of manufacturing a plurality of thermoformable plastic articles comprising the steps of reverse printing a plurality of markings on one face of a substantially flexible transparent plastic sheet; positioning the plastic sheet with respect to a substantially rigid plastic layer having a plurality of core portions to cause locations of the plurality of markings to be in registration with substantially identical predetermined locations on the core portions, respectively; adhering the plastic sheet to the plastic layer to cause the markings to be in registration with the predetermined locations; thermoforming the articles into 3-dimensional shapes such that the markings are in registration with the predetermined locations in all three dimensions; and separating the thermoformed articles into the plurality of articles.

BRIEF DESCRIPTION OF THE DRAWINGS

The foregoing summary as well as the following detailed description will be better understood when read in conjunction with the appended drawings. For the purposes of illustrating the invention, there is shown in the drawings an embodiment which is presently preferred, it being understood, however, that the present invention is not limited to the precise embodiments shown. In the drawings:

FIG. 5 is a plan view of a tray preform, a laminated sheet and core, prior to thermoforming;

FIG. 6 is a close-up view of one of the thermoformable trays depicted in FIG. 5;

FIG. 7 is a schematic depiction of the reverse printing of the preform;

FIG. 8 is a schematic depiction of the laminating of the plastic sheet to the core plastic layer; and FIG. 9 is a schematic representation of the thermoforming process.

DETAILED DESCRIPTION OF THE INVENTION

Figure 1:
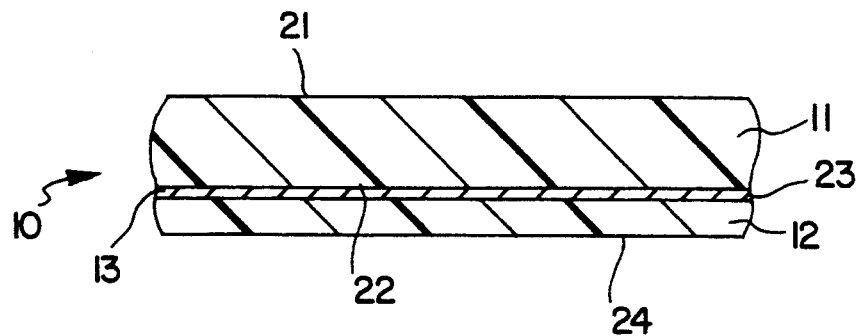
FIG. 1 is a sectional view of a two layer laminate according to the present invention.

Referring to the drawings wherein like reference numerals are used to indicate like elements throughout the figures, there is shown in FIG. 1, a thermoformable laminate material 10 which comprises a rigid polymeric core material 11 having interior and exterior faces 21 and 22, respectively, and a first flexible sheet material 12 laminated thereto. The first flexible sheet material has two opposing sides 23 and 24 and is printed on one side with printed matter 13 prior to lamination to one face of the rigid polymeric core material. Such printed matter may include, without limitation, printing, designs, etc. Preferably, the printed side 23 of the first flexible sheet material is laminated to the exterior face 22 of the rigid polymeric core material 11. When laminated in this manner, the printed matter 13 will be protected from the environment by the first flexible sheet material 12 while remaining visible therethrough.

The present laminate provides an oxygen and moisture barrier for materials contained therein. This is particularly important when the present material is used to contain food materials, as the barrier prevents the food from rapidly degrading due to oxygen and moisture exposure.

It is preferred that the present laminate material be microwaveable. The microwaveability of the laminate material is desirable from the viewpoint of convenience, particularly when the laminate is thermoformed into the shape of a tray or other container to hold microwaveable foods. In this instance, the consumer may purchase pre-cooked foods contained in the present thermoformed laminate, and place them directly from the freezer or refrigerator into a microwave oven without the necessity of using a separate container.

The rigid polymeric core material 11 employed in the present invention may be any of conventionally used polymeric materials. For example, any of the polyester, polypropylene, copolyester, acrylonitrile, Styrofoam ®, or high impact polystyrene may be used as the rigid polymeric core. Preferably, polyester is used as the rigid core material 11. Moreover, the rigid core 11 may be a 2 to 6 or more ply coextrusion of the chosen polymeric material. The rigid polymeric core material 11 may be either a single layer of polymeric material or may itself be a laminate of two or more such layers. The use of a single layer or laminate core for a particular application will be evident to one of ordinary skill in the art based upon the present disclosure.

Preferably, the rigid polymeric core material 11 is transparent. The use of a transparent material for the core facilitates viewing of matter printed on the flexible sheet materials in certain constructions. Preferably, when the rigid polymeric core material 11 is transparent, the flexible sheet material 12 is surface-printed and the printed side of the flexible sheet is laminated directly to the interior face 21 of the core material 11. Such a construction will facilitate viewing of the printed matter through the interior face of the core 11, while protecting the printed matter 13 from being scratched off. Moreover, this construction will protect any foodstuffs which are placed on the interior of the laminate and which may be contaminated by the printing. Of course, if the printed matter is viewed through side 24 of sheet material 12, the flexible sheet 12 is preferably reverse-printed.

As the first flexible sheet material 12 of the present invention, a number of conventionally used polymers may be employed. For example, polypropylene, polyethylene, copolyester, nylon, polyester and co-extruded materials as are known and will be appreciated by those skilled in the art, may be used as the flexible sheet material 12 of the invention. Preferably, polyethylene is used as the first flexible sheet material 12. The first flexible sheet material 12 may have a thickness of about 0.048 to about 5.0 mils., depending upon the particular shape the present laminate will be thermoformed into and the use to which it will be put. Preferably the first flexible sheet material will have a thickness of about 0.048 to about 0.075 mils. However, appropriate thicknesses for particular applications will be evident to one skilled in the art based upon the present disclosure.

When laminated to one face of the rigid polymeric core 11, the first flexible sheet material 12 serves a number of functions. For example, the laminated flexible sheet material 12 provides both decorative functions (i.e., provides for the use of printed matter 13 on the laminate material, such as recipes, instructions, UPC codes, etc.) and barrier characteristics on the rigid polymeric core. When laminated to the core material 11, the first flexible sheet material 12 eliminates the necessity of using additional layers, such as shrink wrap, boxes, labels, etc., to provide these functions.

The lamination of the first flexible sheet material 12 (which includes printed matter 13) to the rigid core material 11 allows for the provision of printed matter 13 on one face of the core material 11 without the necessity of using specialized equipment which is needed for printing on high-gauge materials such as the core. Therefore, when the laminate of the present invention is used, conventional high-speed printing presses may be employed to preprint the first flexible sheet material 12 and the thus printed flexible sheet material 12 may then be laminated directly to one face of the rigid polymeric core material 11.

For printing the sides or faces of known three-dimensional rigid polymeric materials, specialized equipment, such a sheet-fed offset presses, etc., are required. The use of such specialized equipment is time consuming and expensive. In contrast, in preparing the thermoformable laminate material of the present invention, conventional high-speed printing presses, such as rotogravure or flexographic presses, may be used to efficiently print the flexible sheet material 12 and conventional laminating techniques may be used to adhere the flexible sheet 12 to the rigid core material Accordingly, the laminate of the present invention may be produced more efficiently and cost effectively in comparison to conventional packaging constructions.

Figure 2:
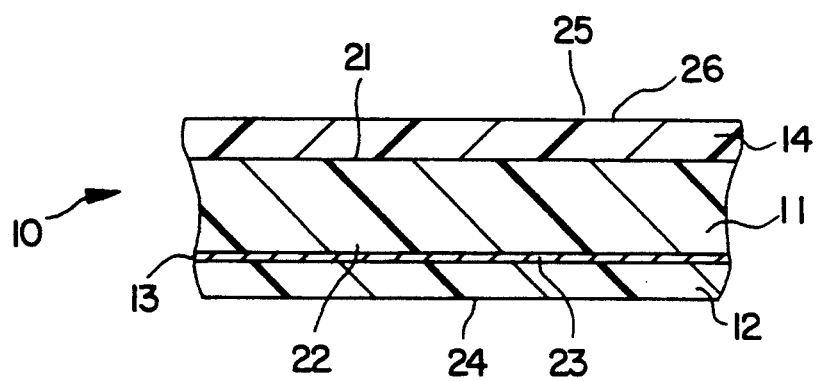
FIG. 2 is a sectional view of a three layer laminate according to the present invention.

If desired, the present laminate may further comprise a second flexible sheet material. As can best be seen in FIG. 2, the second flexible sheet material 14 also has two opposing sides 25 and 26, and may be laminated to the opposing or interior face 21 of the rigid polymeric core material 11. This second flexible sheet material 14 may also be printed on one side prior to lamination in the same manner as the first flexible sheet material 12. It is preferred that the printed side of the second flexible sheet material 14 be laminated to the opposing or interior face 21 of the rigid polymeric core material 11.

The second flexible sheet material 14 may be composed of the same materials which may be used for the first flexible sheet material 12, discussed above. Preferably, the second flexible sheet material 14 comprises polyester. The second flexible sheet material 14 may also have a thickness of about 0.048 to about 5.0 mils., depending upon the particular shape the laminate will be thermoformed into and the particular use to which it will be put. Preferably the second flexible sheet material 14 will have a thickness of about 0.048 to about 0.075 mils. However, appropriate thicknesses for particular applications will be evident to one skilled in the art based upon the present disclosure.

Both the first and second flexible sheet materials 12 and 14, respectively, may be printed in any conventional manner generally known in the art such as surface printing or reverse-printing so that the printed matter may best be seen from the chosen viewpoint. That is, depending upon which sheet is being printed, from which side the printed matter will be viewed and whether the printed side of the sheet material is laminated to the core or away from the core, the sheet may be either surface or reverse-printed.

For example, in the instance wherein the first flexible sheet material 12 is laminated to the exterior face 22 of the rigid polymeric core material 11 and the printed matter is to be viewed from the exterior of the laminate, the first flexible sheet material may be reverse-printed (if the printed side is to be laminated directly to the core) or surface printed (if the printed side is to face the exterior of the laminate). On the other hand, if the printed matter is to be viewed from the interior of the laminate (i.e., if the core is transparent), the first flexible sheet material should be surface printed if the printed side is to be laminated directly to the core. This is also true for the second flexible sheet material 14, although the situations would be altered accordingly to facilitate viewing of the printed matter.

The flexible sheet materials 12 and 14 may be laminated to the rigid polymeric core material 11 with any of a number of adhesives conventionally used in the art. However, preferably, a polyvinyl dichloride (PVDC) adhesive is used to laminate the flexible sheet material (12 or 14) to the rigid polymeric core material 11. More preferably, Saran ® adhesive manufactured by Dow Chemical Co., Midland, Mich. may be used to laminate the flexible sheet materials 12 and 14 to the rigid polymeric core material 11. The Saran ® adhesive provides both lamination capabilities and barrier characteristics to the final product. To provide effective lamination, the adhesives may be used in an amount of about 2 lbs. to about 3 lbs. per ream and preferably about 2.5 lbs. to about 3 lbs. per ream, although other appropriate quantities of adhesive may be used as will be apparent to one skilled in the art based upon the present disclosure.

Other adhesives may be utilized within the scope of the present invention depending upon the sheet and core materials, upon the forming process, and upon the end use for which the product is designed. For example, the water-based PVDC adhesives may be used where barrier properties are important. Alternatively, solvent-based adhesives may be used where barrier properties are not critical. For example, the ADCOTE ® family of adhesives by Morton Chemical Co., may also be used. Furthermore, so-called solvent-less adhesives (partially-polymerized; monomers polymerized in short chains) may also be used. Also, adhesives such as EVOH may be used. Likewise, hot melt adhesives (glues) may also be adapted to the present invention depending upon the materials selected for the core and sheet. Whatever adhesive is selected, it is helpful if that adhesive is in the same chemical family as the sheet and core materials in order to enhance the recyclability of the product.

Figure 3:
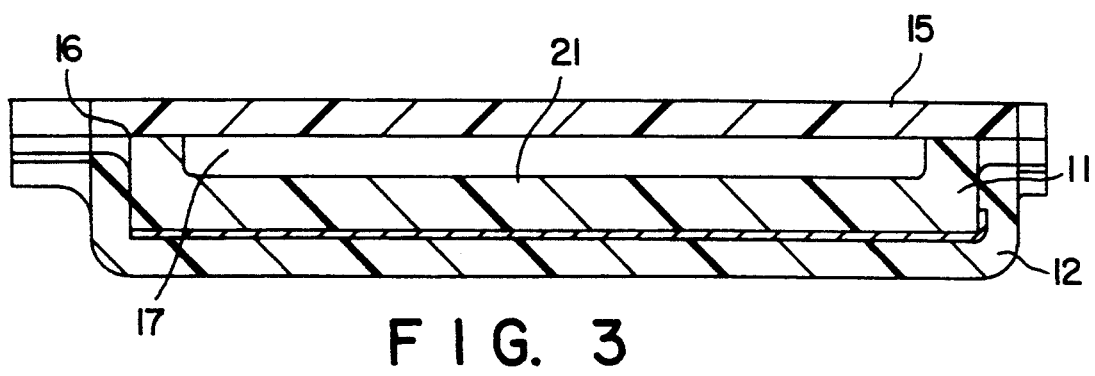
FIG. 3 is a sectional view of an embodiment of the present laminate which is thermoformed into the shape of a tray, further comprising a lid component.

When thermoformed into the shape of a tray, container, or other object for carrying foodstuff or other materials, it is preferred that the laminate material of the present invention also comprise a lid component. This embodiment can best be seen in FIG. 3. The lid component 15 should be of sufficient size to cover the entire interior face 21 of the rigid core 11. The lid 15 is preferably attached to the edges 16 of the rigid polymeric core material 11 in such a manner so that it covers or encases the interior face 21 of the rigid core 11 and forms a tight seal with the core material 11. Appropriate methods of attachment of the lid 15 to the core material 11 will be evident to one skilled in the art based upon the present disclosure. When the lid 15 is attached to the edges 16 of the core material 11 in this manner, a cavity 17 is closed between the rigid core material 11 and the lid 15. The cavity 17 facilitates holding of foodstuffs or other materials within the tray, container, etc.

The lid component 15 may comprise any suitable polymer material known and used in the art. However, it is preferred that a polymeric material be chosen so that lid 15 is both chemically and physically compatible with both the rigid polymeric core 11 and the flexible sheet materials 12 and 14. Such chemical and physical compatibility facilitates recycling of the final product. Accordingly, the lid component 15 may comprise a number of conventionally used polymers, including polyester, polypropylene, polyethylene, co-extruded materials, etc. The use of a specific polymer for the lid 15, as needed for a particular application, will be evident to one of ordinary skill in the art based upon the present disclosure.

The present invention also encompasses a method of making a thermoformable laminate material which comprises printing one side of a first flexible sheet material having opposing sides, laminating the first flexible sheet material to one face of a rigid polymeric core material having interior and exterior faces and thermoforming the resultant laminated material to provide a shaped object. Preferably, the printed side of the first flexible sheet material is laminated directly to one face of the rigid polymeric core material. More preferably, the printed side of the first flexible sheet material is laminated directly to the exterior face of the rigid polymeric core material.

Conventional laminating techniques employing laminating equipment known to those skilled in the art may be used in the present process. For example, extrusion-lamination may be used to form the preform. The flexible sheet materials may be printed using conventional high-speed printers, such as rotogravure or flexographic printers.

The present process further comprises thermoforming the present laminate into a desired shape and size as needed for a particular purpose. Any conventional thermoforming process using conventional thermoforming equipment may be used for this purpose. However, for embodiments employing registered print (to be discussed below) conventional thermoforming equipment may be inadequate. The use of a particular thermoforming process for a specific application will be evident to one skilled in the art based upon the present disclosure.

The thermoformable laminate material of the present invention may be thermoformed into various shapes as needed for a particular use. For example, the laminate may be thermoformed into packages, trays, signs, etc. In a preferred embodiment of the invention, the laminate material is thermoformed into the shape of a tray for packaging food materials for ultimate consumer use.

The process for making the thermoformable laminate material of the present invention may further comprise printing one side of a second flexible sheet material having opposing sides and laminating the second flexible sheet material to the interior face of the rigid polymeric core material. The second flexible sheet material may also be printed and laminated using conventional techniques, as discussed above with reference to the first flexible sheet material.

In constructions where a second flexible sheet material is laminated to the interior face of the rigid polymeric core in this manner, both flexible sheet materials should be laminated to the core material prior to thermoforming.

From the standpoint of practicality, the present material may be printed, laminated and then formed into rolls of desired lengths. Once the laminate is formed, the material may then be unrolled, thermoformed and cut into the desired shape and size. Alternatively, the rigid core and printed flexible sheets may be laminated in-line, thermoformed and cut.

Registered printing of thermoformable planar articles and thermoformable non-planar articles, as provided by the invention, offers advantages to producers of foodstuffs, beverages, etc. In particular, the ability to accurately place printing, designs, and bar codes on heat-formed non-planar plastic articles allows customers to quickly and easily discern the ingredients of such articles as well as their source of origin and price. Heretofore, registration of the printing on such thermoformed articles has been thought to be impossible for practical purposes. However, the present inventors have discovered that by proper control of a number of processing variables, markings can be predictably and precisely located at predetermined locations on the finished thermoformed article. Embodiments featuring registered markings will be described below.

Figure 4:
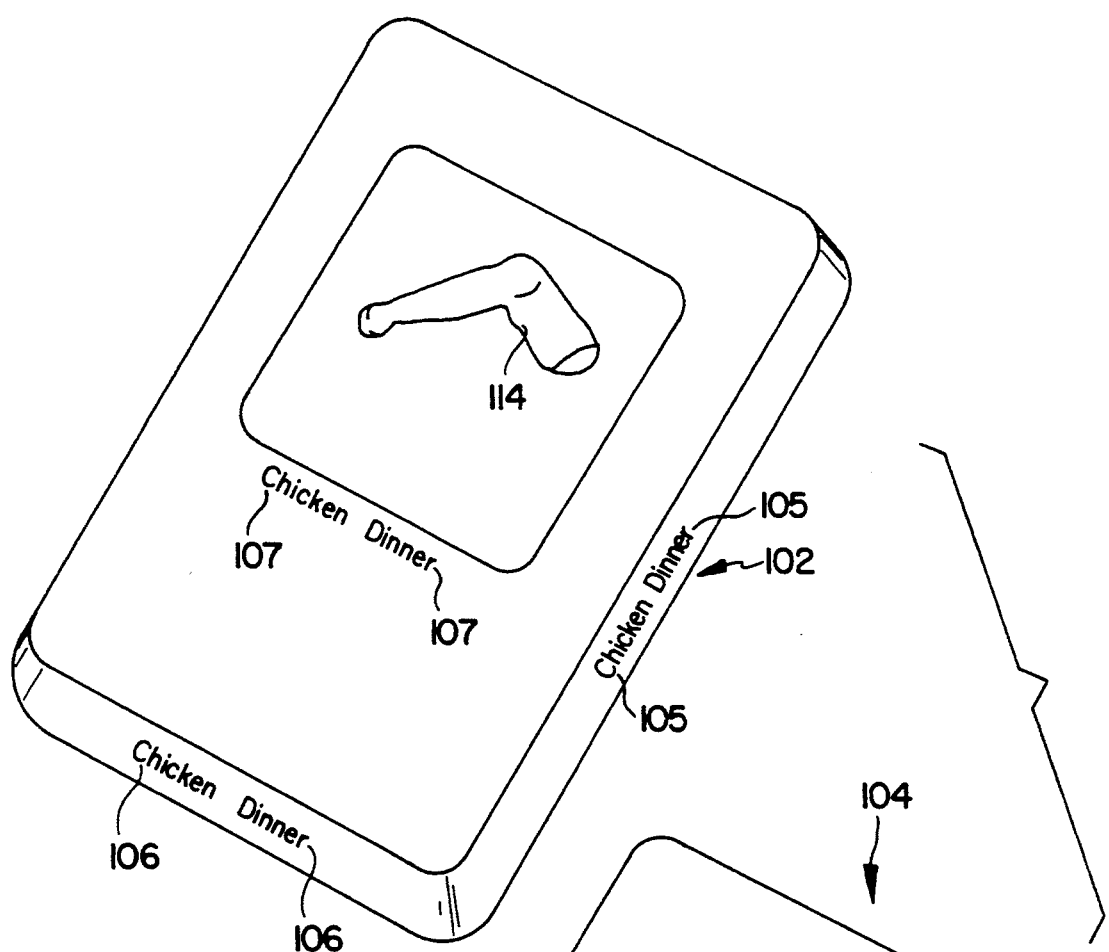
FIG. 4 is a perspective view of a plurality of thermoformed articles demonstrating registered printing.
Figure 4:
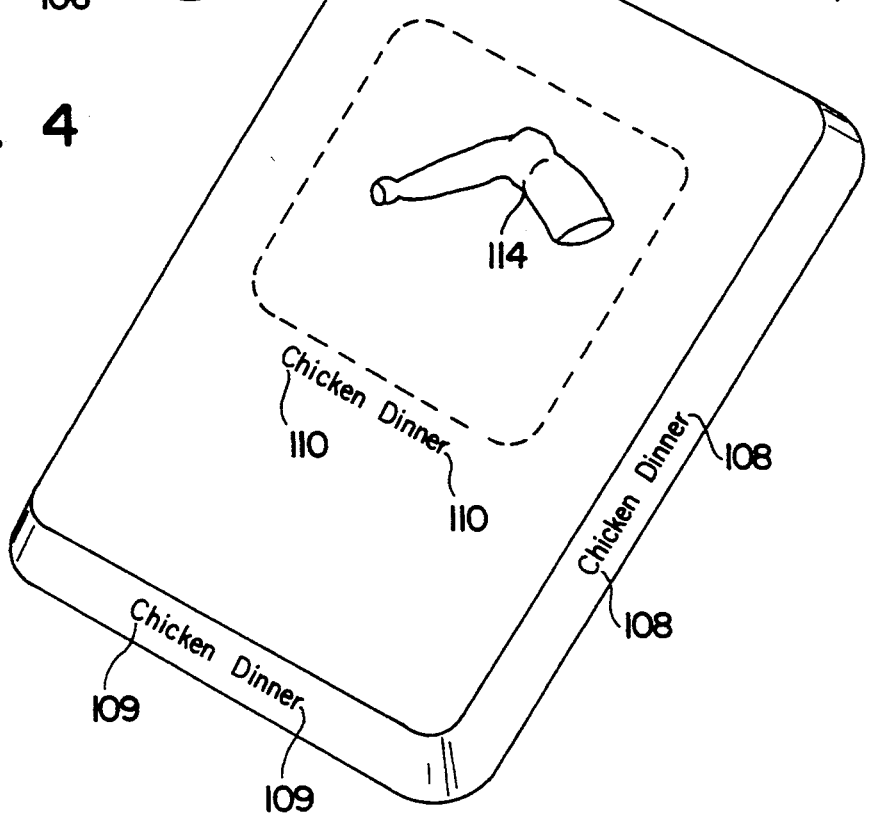

FIG. 4 depicts a plurality of like thermoformed plastic laminate trays 102 and 104. Note that lettering 105, 106, 107 on tray 102 are located at the same positions, respectively, as lettering 108, 109, 110 on tray 104. Likewise, design 114 is located at the same position on tray 102 as the design 116 on tray 104. These registered markings are evident in each of the approximately orthogonal planes which make up the trays 102 and 104. Thus, according to one embodiment of the present invention, the trays 102 and 104 are three-dimensional articles and the printing is registered in all three dimensions. The trays 102 and 104 may have lids (hinged or detached) which may also incorporate the features of the present invention. Furthermore, a flexible plastic overwrap may be applied to the tray after the product has been placed therein.

Achieving registered markings in all three dimensions of a thermoformed laminate plastic article requires proper control of a number of processing variables according to this invention. The first step in producing such articles is the marking of a flexible plastic sheet. This process is schematically depicted in FIG. 7 where, for example, a transparent, flexible polyester sheet 118 is passed through printing station 120 from supply reel 122 to take up reel 124. Preferably, the sheet 118 is surface or reverse printed with multi-color inks utilizing rotogravure or flexographic printing presses. Markings such as letters, symbols, designs, bar codes, etc. may be formed on the sheet 118. Since printing is only required to be two-dimensional (i.e., planar) at this stage, printing can be quickly and economically carried out. Preferably, the ink is 1–5 microns thick. Also, the ink should comprise a resin having the same characteristics as the plastic sheet, for example, a polymeric resin. This will greatly assist in the ink adhering to the plastic sheet to prevent delamination during the thermoforming process. Also, by making the ink the same material as the plastic sheet, the entire product will be easily recyclable.

During the printing process, a positioning mark 126 (FIG. 5) is printed along one edge of plastic sheet 118 at a predetermined location. This mark is used to precisely locate the plastic preform in the thermoforming station, as will be described below. The positioning mark 126 is preferably a blue or black ink so as to cooperate with an optical scanner to be described below.

FIG. 8 depicts the lamination of the plastic sheet 118 to the substantially inflexible core material 126. Preferably, the core material 126 comprises an opaque polymeric material such as polyester having a thickness of 20–30 mils. Also, it is preferable that the printing and laminating steps be performed in-line.

An adhesive 128, such as Saran ®, is applied as a liquid between the plastic sheet 118 and the core material 126 prior to the laminator station 132. The plastic sheet 118 and the core material 126 are laminated together with, e.g., a hot nip, in order to produce a permanently adhered laminate structure. The laminated preform 134 is preferably wound on a take-up reel 136 for transportation to the thermoforming station. The positioning of the plastic sheet 118 and the core material 126 in the laminator station 132 is important in order to produce a preform 134 which has precisely ordered markings thereon. Specifically, the markings printed on sheet 118 must be located at predetermined positions on the core material 126. Those of ordinary skill in this field understand the positioning of the plastic sheet 118 with respect to the core material 126 requires control of variables such as the tension of the reels 124, 130, the driving speed of these reels, ambient temperature, the amount of adhesive applied, the curing time of the adhesive, the synchronization of the driving of the reels 124, 130, etc. In particular, it is important that the adhesive be applied to all areas of the sheet with a uniform thickness to prevent delamination of the product during the thermoforming process. Of course, each variable will be controlled depending upon the plastic materials used, the type of laminator equipment, etc.

After laminating in the laminator station 132, the preform is preferably rolled on a take-up reel 136. However, as will be readily apparent, the laminated preform 134 may be passed directly to the thermoforming station to be described below.

The use of Saran ® or another adhesive which has a nature and content in common with both the polymeric plastic sheet 118 and the core material 126 is advantageous in terms of recyclability. In particular, the thermoformed article can be easily recycled since the sheet, the core, and the adhesive all comprise similar materials. In the preferred embodiments discussed above, the sheet, the core, and the adhesive all comprise a polymeric material. It is thus preferred, but not required, for the finished article to be homogenous in nature so that recycling will be easier and less expensive.

FIG. 5 depicts a portion of the preform 134 as it emerges from laminator station 132. A plurality of core portions 138 include the printed plastic sheet 118 and the core material 126. Each core portion has markings 139 thereon. While the preform 134 is depicted as a matrix of core portions, it will be evident to those of skill in the field that the preform may comprise one or more core portions which may be formed by any known and convenient forming process, such as thermoforming, blowing, etc.

Since the two-dimensional preform 134 will be preferably formed into a three-dimensional shape, such as a tray, much distortion in the marking will take place in those areas of the tray which are subjected to the greatest amount of movement (i.e., stretching or malformation due to the tension and compression forces acting on the preform during thermoforming process in the thermoforming station). Referring to FIG. 6, the dash-line area 140 represents those areas of the finished tray which are subjected to the greatest distortion in the thermoforming process. The present inventors have discovered that by "predistorting" markings within this area 140 before the thermoforming process, the markings in this area after the thermoforming process will not be visually distorted. For example, a round structure 142 which appears outside of area 140 will not be distorted in the thermoforming process. However, if this round marking 142 were within the area 140, an elongated marking would appear after thermoforming. Therefore, in the area 140, a predistorted, elongated marking 144 is printed on the plastic sheet 118. Now, during the thermoforming process, the area 140 will be subjected to distortion thus changing the elongated shape 144 into a substantially circular marking. This will be pleasing to the consumer. In the same fashion, colors may be predistorted. For example, the shaded area 146 may comprise a light blue portion 148, and a dark blue portion 150 positioned within the area 140. This way, after thermoforming, the color density in the entire area 146 will be uniform light blue. In this fashion, lettering, designs, symbols, colors, etc. may be predistorted so that the distortions incurred in the forming process are alleviated beforehand.

FIG. 9 is a schematic diagram of a thermoforming station according to an embodiment of the present invention. Those of skill in the field will realize that the concept of registered printing of this invention may be applicable to other means of forming plastic into three-dimensional articles. In FIG. 9, the reel 136 containing the preform 134 is mounted upstream of a drive mechanism 152. The drive mechanism 152 may comprise a chain-drive system, a belt-drive system, a sprocket-drive system, or any other known or convenient method of driving the preform through the thermoforming station.

The preform 134 is then introduced into heater station 154. The heater station may include heating elements above and below and on both sides of the preform 134. The heater station 154 may include a plurality of heating areas, for example three, to ensure that the preform 134 reaches a uniform, constant temperature before it is sent to the vacuum-forming station 156. Temperatures within the heater station will vary depending upon the type of materials used, the dimensions of the preform, the speed of movement of the preform through the heater station, etc. For example, temperatures within heater station 154 may vary from 160° F.–325° F. for polymeric materials.

The system controller 158 may comprise a computer which controls the heating elements within heater station 154 as well as the speed of the drive element 152. The heater station 154 may include temperature sensing elements to feedback the sensed temperature to system controller 158. This way, the system controller 158 can adjust the heat of individual elements to ensure a uniform and constant temperature for the preform 134.

After heating the preform 134 to the appropriate temperature, the drive system 152 drives the preform into a vacuum forming station 156. Therein, molds and air pressure may be used to shape the three-dimensional plastic article, as is known by persons of ordinary skill in the field. The system controller 158 controls the movement and operations of the molds, air systems, etc. within the vacuum forming station 156.

The placement of the preform 134 within the vacuum forming station 156 is important in order to achieve registered printing. In particular, the printed portions of the preform must be located at predetermined locations with respect to the molds within the vacuum forming station 156 so that the printing will be at the desired predetermined location on the finished article. In order to properly locate the preform 134 within the vacuum forming station 156, an optical scanner 160 is positioned downstream of the vacuum forming station 156 to detect the positioning mark 126 on the preform. When optical scanner 160 detects the positioning mark 126, it sends a signal to system controller 158 which will then command the drive mechanism 152 to stop driving the preform 134 at a specific location.

While the optical scanner 160 and system controller 158 are used to precisely position the preform 134 longitudinally within vacuum forming station 156, transverse positioning is also important. Transverse positioning is usually affected by the drive mechanism 152, the tension on the preform reel 136, the temperatures within the heater station 154, the mechanisms used to guide the preform 134 through the heater station and the vacuum forming station (e.g., roller wheels, etc.), the type of material, the ambient temperature, etc. Accurate control of such variables will produce the registered printing according to the present invention.

After the plastic articles have been formed in the vacuum-forming station 156, they are driven toward a die cutter and stacking station 162. Therein, the individual plastic articles are cut from the preform 134 and stacked for later removal. The system controller 158 will control the die cutter and stacking mechanisms within the station 162. The structure, functions, and operations of such die cutter and stacking stations are well-known to persons of skill in this field and will not be described further herein.

In summary, the method of producing the thermoformable plastic articles according to the present invention involves (1) the careful positioning of the preprinted plastic sheet with respect to the plastic core layer before lamination, and/or (2) the careful positioning of the preform within the forming station. By the use of adequate control measures described above, these operations can be performed to produce a plastic laminate article in which the markings are at predictable, predetermined locations on the finished article.

Therefore, what has been described above is a plastic thermoformable laminate structure having registered markings, relative impermeability to air and moisture, and a rugged light weight structure. The method of manufacturing such articles according to the present invention is capable of high-speed, inexpensive operation once the above-described variables are properly controlled. Articles produced according to the present invention will enable manufacturers and consumers alike to realize savings in cost and time.

The individual components shown in outline or designated by blocks in the Drawings are all well-known in the plastic-laminate forming arts, and their specific construction and operation are not critical to the operation or best mode for carrying out the invention.

The present invention may be embodied in other specific forms without departing from the spirit or essential attributes thereof and accordingly, reference should be made to the appended claims, rather than to the foregoing specification and drawings, as indicating the scope of the invention. For example, the laminate articles may be two or three-dimensional, and may include food trays (lidded or unlidded), drinking cups, bottles, etc. In fact, articles according to the present invention may be applicable to a very wide range of uses. For example, any packaging requiring barrier properties to prevent passage moisture, chemicals, etc., may utilize the features according to the present invention. Thus, the present invention may be applied to containers for chemicals, sanitary products, cosmetic products, pharmaceuticals, pesticides, insecticides, detergents, pet food, baby wipes, CD disks, toys. Also, non-barrier products having registered printing according to the present invention will also find application in retail outlets for displaying/advertising goods and services. For example, posters, signs, displays may all be inexpensively and efficiently mass produced using the techniques of the present invention.

The articles according to the present invention, may include angles which are acute, obtuse, or perpendicular. The articles may also have rounded or curvilinear shapes. In addition, the plastic core may be transparent or translucent, and the plastic sheet may be located on either the inside or outside of the core material. The marking may be on the inside or outside of the plastic sheet, and may comprise inks, powders, plastic overlays, or any other known or convenient marking applied to the plastic sheet prior to the forming process. Also, the process of forming the finished plastic article may be thermoforming, blowing, folding, die cutting, injecting, extrusion, or any other known or convenient method of working the material. Furthermore, by choosing appropriate materials for the plastic sheet and the core layer, the adhesive layer may be eliminated. If an adhesive is used, it may comprise a liquid, a powder, a spray or any combination of these. Also, while plastic materials are preferred due to their ease of recyclability and low expense, other materials may be used such as composites, rubber-based materials, etc. In addition, it may be desireable to laminate more than one plastic sheet on the same side of the core material, and each sheet may have markings thereon.

What is claimed is:

1. A plurality of like, thermoformable plastic laminate structures, each structure comprising:
    a rigid thermoformable plastic core; and
    a flexible transparent plastic sheet permanently laminated to the core so that the shape of the sheet conforms to the shape of the core, the sheet having an ink disposed on one face thereof,
    the ink being disposed at the same predetermined location with respect to the core for all of the plurality of structures, the ink being in a shape and/or a color which is predistorted.

2. A plurality of structures according to claim 1, wherein the ink is disposed on the face thereof which contacts the core.

3. A plurality of structures according to claim 1, wherein each of the plastic sheets is non-transmissive to air and moisture.

4. A plurality of structures according to claim 1 further comprising an adhesive layer between the core and the sheet, the adhesive layer comprising a material which is common to both the core and the sheet.

5. A plurality of structures according to claim 1 wherein the structures are three-dimensional in shape, and wherein the ink is disposed on the sheet in each of the three dimensions, ink in each of the three dimensions being disposed at the same predetermined location with respect to the core for all of the plurality of structures.

6. A plurality of structures according to claim 1, wherein the structures comprise two-dimensional preforms.

7. A plurality of structures according to claim 1, wherein each structure comprises a tray having a top face and four side faces generally orthogonal to the top face, and wherein the ink is disposed on at least two of the faces, the ink being disposed at substantially the same predetermined location with respect to the core for all of the plurality of structures.

8. A plurality of structures according to claim 1, further comprising a second flexible plastic sheet bonded to the core on a face thereof which is opposite the face to which the transparent plastic sheet is bonded.

9. A plurality of structures according to claim 8, wherein the second sheet comprises a transparent sheet having an ink disposed on one face thereof.

10. A plurality of structures according to claim 1 wherein the core comprises a transparent material.

11. A plurality of structures according to claim 1, wherein the structures comprise three-dimensional trays, each tray having a corresponding lid.

12. A plurality of like, substantially inflexible plastic composite articles, each article comprising:
    an inflexible non-foam plastic core; and
    a flexible plastic sheet laminated to the face of the core so that the shape of the sheet conforms to the shape of the non-foam core, the sheet having a marking adhered to the side thereof which is affixed to the core, wherein the position of the marking with respect to the core is registered for all of the plurality of articles, the marking being disposed on two angled planes of each article, the marking on at least one angled plane being registered for all of the plurality of articles.

13. A plurality of structures according to claim 12, wherein each article includes a horizontal portion, and a portion forming an angle with the horizontal portion, and wherein the marking is disposed on both portions, the markings on both portions of one article being registered with the corresponding markings on both portions of a second article.

14. A plurality of structures according to claim 12, wherein the marking includes a portion which is predistorted.

15. A thermoformable plastic product comprising:
a rigid thermoformable plastic core;
a flexible, transparent plastic sheet laminated to the core, so that the shape of the sheet conforms to the shape of the core; and
a marking adhered to the sheet in registration with a predetermined location on the core, the marking being disposed on one face of the sheet, the marking being in a shape and/or a color which is predistorted.

16. A product according to claim 15, wherein the marking comprises reverse-printed multi-colored inks.

17. A product according to claim 15 wherein the product comprises a substantially rectangular, three-dimensional tray having registered markings on two substantially orthogonal faces thereof.

18. A product according to claim 15, wherein said marking is adhered to the face of the plastic sheet which is laminated to the core.

19. A thermoformed plastic container comprising:
an inflexible non-foamed plastic layer;
an adhesive layer adhered on one face of the inflexible layer; and
a flexible, transparent plastic layer having printing on a face thereof which is laminated to the inflexible layer by the adhesive layer, the shape of the flexible plastic layer conforming to the shape of the non-foamed core, the printing being non-randomly located with respect to the inflexible layer, the printing being disposed on two angled planes of the container, the printing on at least one angled plane being non-randomly located with respect to the inflexible layer.

20. A container according to claim 19 wherein the inflexible layer comprises a polymeric core, and wherein the flexible layer comprises a polyethylene sheet.

21. A plurality of containers according to claim 19, wherein the printing is located at the same predetermined location with respect to each inflexible layer of the plurality of containers.

22. A container according to claim 19, further comprising a lid coupleable to the container.

23. A method of manufacturing a plurality of thermoformed plastic articles, comprising the steps of:
fixing a plurality of markings on one face of a flexible transparent plastic sheet at least one of the markings having a shape and/or a color which is predistorted;
positioning the plastic sheet with respect to a rigid plastic layer having a plurality of core portions, to cause locations of the plurality of markings to be in registration with identical predetermined locations on the core portions, respectively;
laminating the plastic sheet to the plastic layer to cause the markings to be in registration with the predetermined locations and to cause the shape of the sheet to conform to the shape of the plastic layer.

24. A method according to claim 23, further comprising the step of thermoforming the articles into three-dimensional shapes, the markings being in registration with the predetermined locations in all three dimensions.

25. A method according to claim 24, wherein the positioning step includes the step of positioning the plastic sheet so that the markings are adjacent the core portions.

26. A method according to claim 23, wherein the fixing step comprises the step of printing a position indicator at a predetermined location on the sheet, and wherein the thermoforming step comprises the steps of:
moving the adhered sheet and layer into a thermoforming station;
detecting the position indicator on the sheet;
stopping the adhered sheet and layer in response to the detection of the position indicator; and
thermoforming the stopped sheet and layer to form the three-dimensional articles.

27. A method according to claim 26, wherein the moving step comprises the step of driving the adhered sheet and layer toward the thermoforming station uniformly to prevent skewing of the adhered sheet and layer in a direction transverse to the driving direction.

28. A method according to claim 23, wherein the adhering step includes the step of adhering the one face of the sheet to the layer using an adhesive which is of the nature of the layer and the sheet.

29. A method according to claim 23, wherein the marking step includes the step of printing a bar code on the sheet.

30. A method according to claim 23, further comprising the step of adhering a second flexible plastic sheet to the rigid plastic layer on a face of the plastic layer which is opposite the face where the reverse-printed sheet is adhered.

31. A plurality of thermoformed plastic articles produced by the method of claim 23.

32. A method of manufacturing a plastic laminate article, comprising the steps of:
marking one face of a flexible plastic sheet with a marking having a shape and/or a color which is predisorted;
laminating the sheet to a rigid plastic layer with the marking being adjacent the layer so that the shape of the sheet conforms to the shape of the plastic layer, a predetermined portion of the marking being in registration with a predetermined section of the layer;
positioning the laminated sheet and layer in a forming station so that the registered marking is at a predetermined position in the forming station; and
forming the article to cause the registered marking to be at a predetermined location on the formed laminate article.

33. A method according to claim 32, wherein the method produces a plurality of laminate articles, and wherein the forming steps produce articles wherein the registered markings are at substantially identical predetermined locations on the articles, respectively.

34. A method according to claim 32, wherein the forming step includes the step of thermoforming the article into a three-dimensional shape to cause registered markings to be at predetermined locations on the article in all three dimensions.

35. A method according to claim 32, wherein the marking step comprises the step of reverse printing the sheet with multi-color inks.

36. A method according to claim 32, wherein the laminating step includes the step of introducing an adhesive layer between the sheet and the layer, the adhesive layer having characteristics similar to the sheet and the layer.

37. A method according to claim 32, wherein the positioning step includes the step of positioning the registered marking in two dimensions.

38. A plastic laminate article produced by the method according to claim 32.

39. A method of producing a plurality of plastic composite articles, comprising the steps of:

reverse printing a plurality of like markings on a transparent, flexible plastic sheet;

laminating the sheet to a rigid non-foamed plastic layer using an adhesive that has common properties with the sheet and the layer so that the shape of the sheet conforms to the shape of the non-foamed plastic layer;

positioning the bonded sheet and layer in a thermoforming station such that the plurality of like markings are precisely located at a corresponding plurality of locations in the thermoforming station;

thermoforming a plurality of three-dimensional articles such that each of the plurality of like markings is at the same predetermined location on each of the plurality of articles, respectively, the marking of each composite article being disposed on two angle planes, the marking on at least one angled plane being at the same predetermined location for the corresponding one angle plane for each of the plurality of articles; and separating the plurality of articles from one another.

40. A method according to claim 39, wherein the thermoforming step includes the step of thermoforming each article so that markings are disposed in three dimensions, the three-dimensionally disposed markings being located at the same positions among the plurality of markings.

41. A plurality of plastic composite articles produced according to the method of claim 39.

* * * * *

UNITED STATES PATENT AND TRADEMARK OFFICE
CERTIFICATE OF CORRECTION

PATENT NO. : 5,366,791
DATED : November 22, 1994
INVENTOR(S) : JOHH CARR, ET AL.

It is certified that error appears in the above-identified patent and that said Letters Patent is hereby corrected as shown below:

COLUMN 5

Line 1, "material" should read --material 11.--

COLUMN 16

Line 12, "angle" should read --angled--; and

Line 14, "angle" should read --angled--.

Signed and Sealed this

Eighteenth Day of April, 1995

Attest:

BRUCE LEHMAN

*Attesting Officer*

*Commissioner of Patents and Trademarks*